Feb. 26, 1952     A. K. McELROY ET AL     2,587,056
PROCESS FOR DETECTING FAULTS IN THE WELDS WHILE BEING MADE
Filed Dec. 21, 1949     3 Sheets-Sheet 3
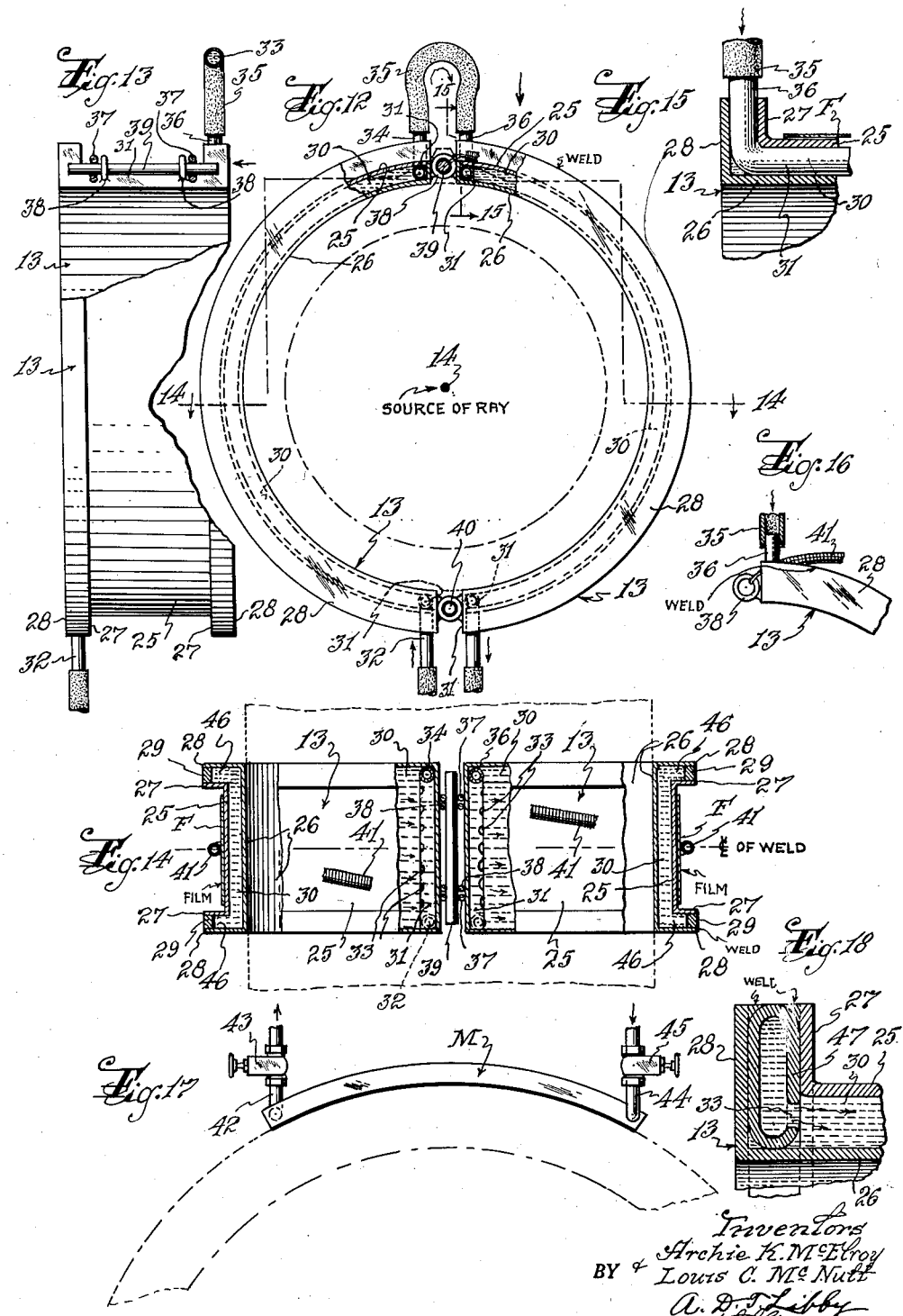

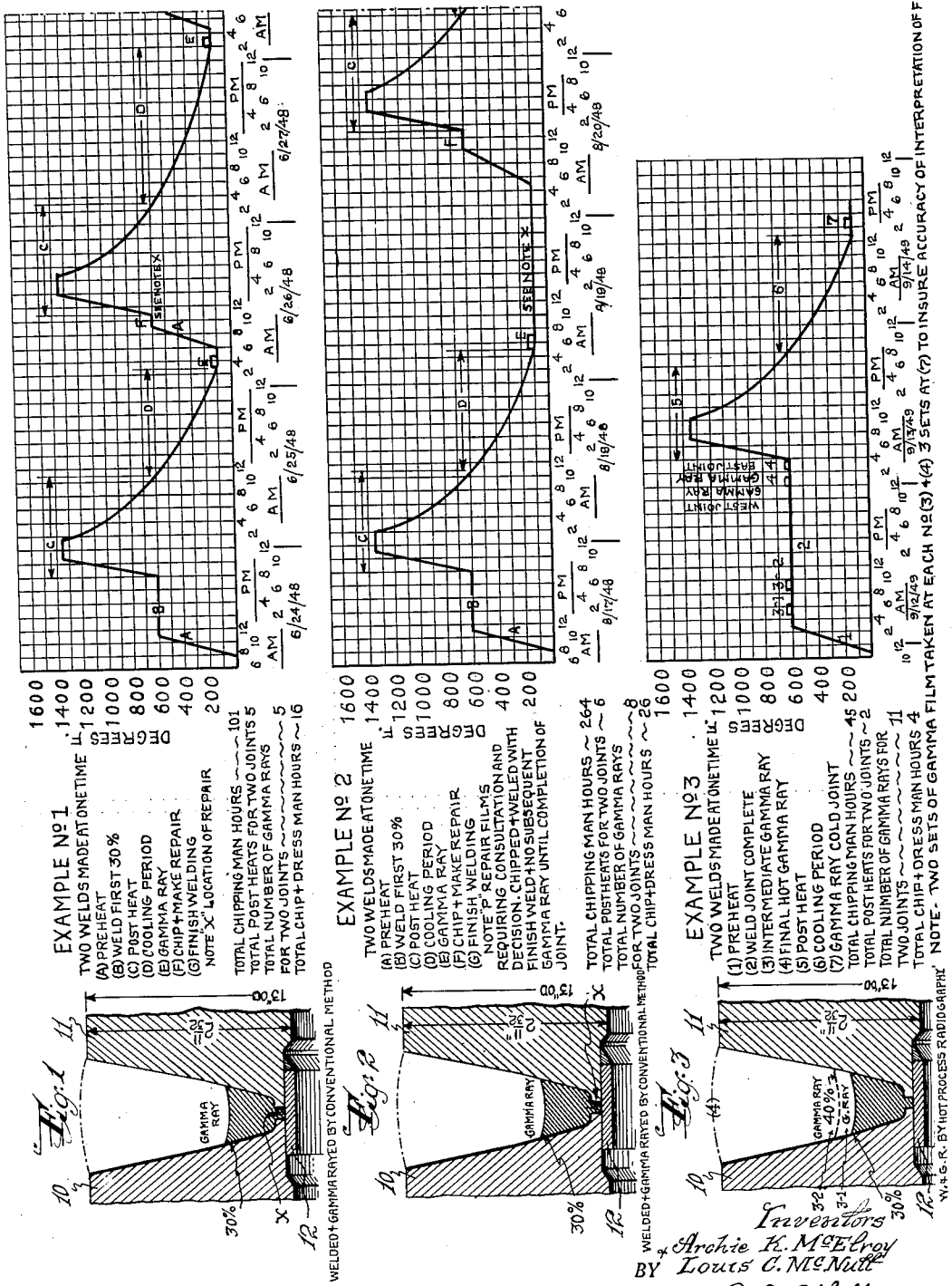

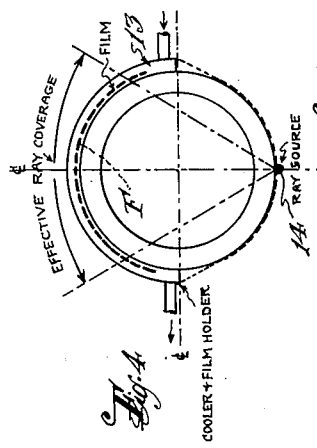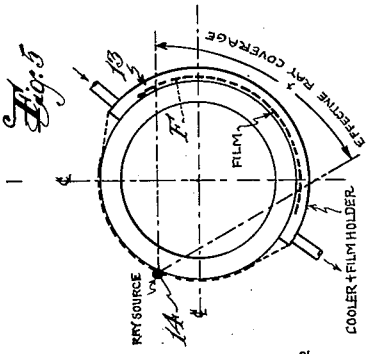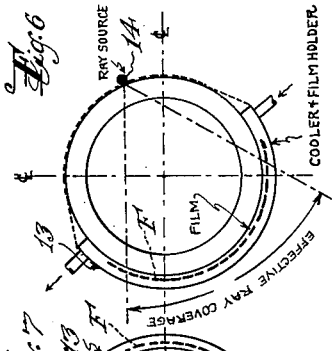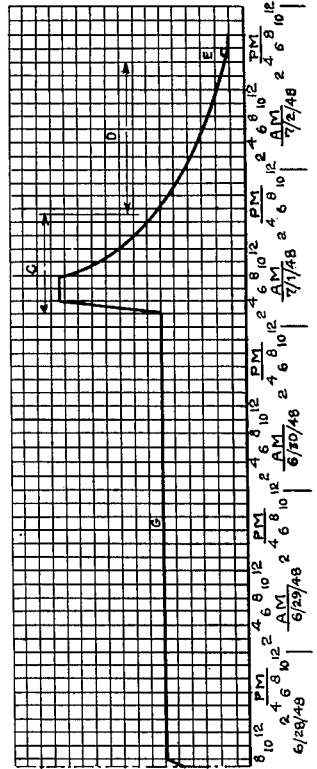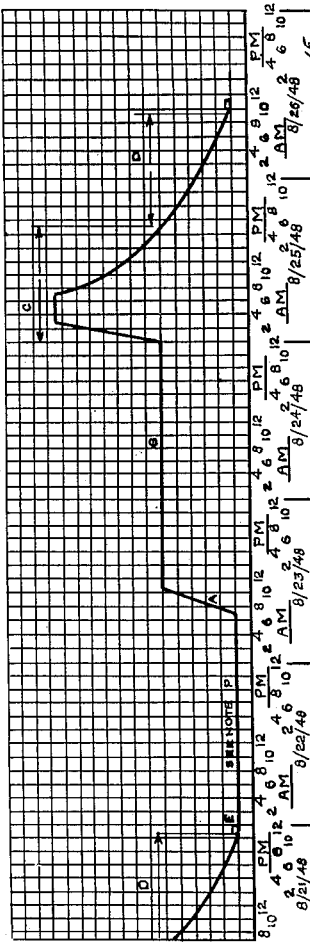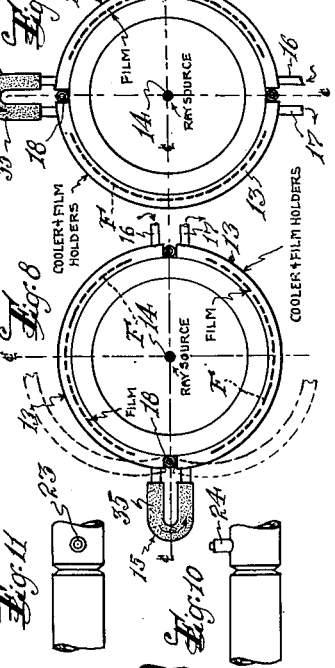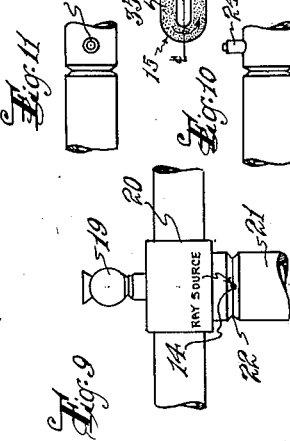

Patented Feb. 26, 1952

2,587,056

UNITED STATES PATENT OFFICE 2,587,056

PROCESS FOR DETECTING FAULTS IN THE WELDS WHILE BEING MADE

Archie K. McElroy, Springfield, and Louis C. McNutt, Scotch Plains, N. J.

Application December 21, 1949, Serial No. 134,304

11 Claims. (Cl. 250—65)

This invention relates to a process of welding metallic structures and means for carrying out the process by which the welds may be inspected substantially co-incident with their being made. In the past such welds have been inspected in the following manner. The surfaces to be welded are preheated up to a certain temperature, then the weld is started and continued to approximately 30% of the whole weld, then the weld is post heated to around 1300° F. and held there for a short period, then the heat is gradually reduced to around 600°, then the weld is allowed to cool down gradually to around 100°, all of which is to release the weld of any strain, then a radiographic film is placed over the weld and exposed to gamma or X-rays from a ray source on the opposite side of the weld from the film. If a defect is noted on the film, then the weld material must be chipped out and the preheat and welding done over, then the metal is post-heated and allowed to gradually cool down to about 100° and another picture taken, if the re-weld is O. K. then the welding operation is carried on to a finish, if no further pictures are taken in the manner described and finally a post heat and gradual taper-off in temperature when a final picture is taken. This process takes a large amount of time as will be later shown.

It is therefore the main object of our invention to greatly simplify the process, by means to be hereinafter described, and thereby save much time and expense. While attaining the principal object a further object is to get the necessary results by relatively simple and inexpensive means.

To better illustrate the advantages of our new process and means for carrying it out we have shown certain concrete and definite examples of welding operations in a large power plant nearly completed by the Public Service Co. at Sewaren, New Jersey.

The invention is thus set forth in the attached drawing in which:

Figure 1 is a combination diagram showing graphically the method of procedure followed prior to our invention in making welds and inspecting them as the welding operations are carried out;

Figure 1a is the right hand end of the curve and data of Figure 1;

Figure 2 is a combination diagram similar to Figure 1 but with somewhat different steps of procedure;

Figure 2a is the right hand end of the curve and data of Figure 2;

Figure 3 is a diagram showing the steps used in our improved process of welding and inspecting same;

Figure 4 shows a single film holding jig used in one step in the process of inspecting radiographically the condition of a pipe that has been welded;

Figure 5 is a view similar to Figure 4 with the inspecting means of Figure 4, shifted approximately 120°;

Figure 6 is a view similar to Figure 5 but with the inspecting means shifted another 120° whereby the entire circumference of the pipe is inspected;

Figure 7 is a view showing how practically all of a pipe made be simultaneously inspected by the use of two jigs of Figure 4;

Figure 8 is a view of Figure 7 turned 90° and showing how the two jigs of the structure encompassing the pipe may be assembled;

Figure 9 shows how a radium capsule can be applied to a valve joint for inspection of a weld at that point;

Figure 10 shows another way of applying a radium capsule to a pipe that is to be welded to another pipe;

Figure 11 is a view of Figure 10 turned 90°;

Figure 12 is a view similar to Figure 7 but on a larger scale and with more of the details showing;

Figure 13 is a side elevation of Figure 12 looking from left to right;

Figure 14 is a view about on the line 14—14 of Figure 12;

Figure 15 is a view on the line 15—15 of Figure 12 on an enlarged scale;

Figure 16 is a fragmentary view at one end of the jig looking in the direction of the arrow Figure 13 without the hinge pin;

Figure 17 is a side view of a modified form of jig.

Figure 18 is a sectional view showing a modified form of cooling fluid pipe.

In the drawings wherein like numbers refer to corresponding parts, Figures 1 and 1a illustrate and give the time and other data for welding two pipes 10 and 11, the size of which is given on the drawing. In Figure 1 the first welding operation is indicated by the weld being started on a backing member 12. After approximately 30% of the weld is made, measured on the radius of the pipe, then a radio-graph is taken and a defect noted at the point X so that much of the weld material will have to be chipped out and a re-weld made. As shown on the diagram forming part of Figure 1, it is to be seen that, over eight days of continuous hours is utilized in completing a satisfactory weld. In Figures 2 and 2a it is seen that the total time required is over nine days, for making two of these pipe welds. Examples 1 and 2 as shown in Figures 1 and 1a, Figures 2 and 2a are made according to the practice then in vogue prior to and during the year 1948 and into 1949.

Since these welding operations at the place heretofore mentioned are under our supervision, the time consumed and expense involved led us to study this problem to get just as good work done with less man hours of labor and loss of time and material. After much study and making many tests we finally discovered the necessary means by which the process of welding was reduced to the process of making the same kind of welding joints in less than three days as shown in Figure 3 and data forming part of this figure.

Since this diagram as well as Figures 1 and 2 convey all the information necessary, further details thereof seem to be unnecessary.

In order to accomplish the results shown in Figure 3 we designed a structure which we term a jig which can be placed over a weld and the jig can be kept cool by passing cooling fluid such as water therethrough so as to prevent the heat from the weld material from injuring the film as shown in Figures 1 and 2 under the old method. In this procedure, the welds had to be heat treated and then cooled down to approximately 100° so that a radio-graphic film laid thereon would not be injured. In Figures 4, 5, and 6 we have shown diagrammatically the three locations of this jig 13 and a ray source 14. With this arrangement the entire circumference of a pipe can be inspected by gamma or X-rays and since the taking of these pictures is only a few minutes in the order of approximately 10–15 and only a very few minutes required to develop the film, the time lost is so small that it doesn't hold up the welding operation for only a short period of time.

In Figure 7 there are shown two of the jigs spanning substantially all of the pipe one end of the jigs being connected by a flexible union 15 passing the cooling fluid which comes in the inlet pipe 16 and out the outlet pipe 17. The two jigs are pivoted together by a joint 18 so that the two parts may be opened up as shown in Figure 8 for application to the pipe. In Figure 9 a safety valve 19 is shown connected to a super-heated header 20 to which a main steam pipe 21 is to be welded at 22. The radium capsule or ray source, is inserted inside the header 20 through the safety valve 19, this figure illustrating one way of utilizing the source of rays for making a picture of the weld. Figures 10 and 11 show another way by which one of the pipes may have a very small hole 23 located therein to receive the nozzle 24 of a radium capsule. In Figures 12, 13 and 14 there is shown a pair of the jigs 13 similar to those shown in Figures 7 and 8. In the construction of one of these jigs two metal plates 25 and 26 are arranged in spaced relation each having outwardly turned flanges 27 and 28 between which is positioned a semi-circular member 29, having width so as to leave a cooling space 46 around said flanges. These flanges and the member 29 are all welded together so as to form a space 30 between the plates for the cooling fluid to pass. While only an inlet nozzle may be used to pass the cooling fluid into the chamber 30 we prefer to pass pipes 31 across the ends of the jig to supply the cooling fluid thereto by a connector 32 and out of the tube through a series of arcuately spaced holes 33. We prefer to make these holes increasing in diameter from the connector 32 to the outlet connector 34 so as to get as nearly as possible a uniform distribution of the cooling fluid over the entire outer surface of the plate 25 so that the cooling effect on the film will be substantially uniform by this method of distributing the cooling fluid through the jig we get better pictures. As shown in Figure 12 the connector 34 is connected by a flexible union 35 to the corresponding connector 36, connected to the jig on the opposite side of the pipe. As shown in Figure 14, it will be seen that the distribution holes 33 at the right hand jig are arranged in reverse order from the left hand jig. The two jigs are fastened together by two pairs of rings, one ring 37 of each pair being welded to the left hand jig while the other ring 38 is welded to the right hand jig and a pivot pin 39 passes through these rings so as to form the hinge for opening and closing the compound jig, it being understood that when the pin 40 is withdrawn from the lower corresponding rings the jigs can be opened up and removed from the pipe. In order to hold the film F, shown for simplicity without a conventional holder in position on the outer plate 25 of the jig we may use any satisfactory means as a light coil spring 41, which attachment is shown at one ring of Figure 16. At Figure 16 we have only shown fragmentary portions of these springs. Preferably they pass on a diagonal line from one corner of the jig to the opposite corner of the jig as is indicated in Figure 14.

In Figure 17 we have shown a modified form of jig M for special purposes and in this form the intake pipe 42 to the jig is provided with a control valve 43 and likewise the outlet pipe 44 has a similar valve 45 for controlling the flow of water or all fluid into the jig. This control has been found to be advantageous by us as in certain cases we get a filtering action whereby the broken or stray radiation from the ray source is stopped by the flow of the cooling fluid through the jig. By controlling the speed of this flow the weaker rays can be bent or carried in the direction of the flow, dependent on the speed of and density of the cooling fluid. While no controlling valves have been shown in connection with Figure 12, it is obvious that valves may be used in the connecting pipes, the same as shown in Figure 17.

In Figure 18 we have shown a modified form arranging the fluid cooling pipes in a semi-circular form corresponding to the form of the jig. In this arrangement the pipes 47 are flattened and disposed between the two flanges 27 and 28 and welded thereto and have openings 33 into the space 30 between the plates 25 and 26. This construction eliminates the pieces 29 and still provides cooling areas to the flanges 27 and 28.

From the preceding description it will be understood that the various types of cooling jigs may be readily and quickly made to suit the various types of welds, forgings and formed steel parts of various kinds of structures and by these means pictures may be taken of the weld, in a very short space of time as heretofore referred to and shown by the data in Figure 3.

It may be noted in passing that the term "ray source" is used to designate any penetrating ray such as given off by radium or X-ray or such other penetrating rays as may be developed.

It will be obvious that many of the details may be varied without departing from the scope or spirit of the appended claims.

What we claim is:

1. The process for detecting faults in metal welds being made or finished which consists in placing a source of radiation such as radium on one side of the weld metal and also in placing a hollow jig on the opposite side of the metal with a radio-graphic film on the outer surface of the jig, then passing a cooling fluid through the jig whereby pictures of the weld may be taken of the weld and adjacent metal even at a temperature up around 1000° F.

2. The process for detecting faults in metal welds being made or finished which consists in placing a source of radiation such as radium on one side of the weld metal and also in placing a hollow jig on the opposite side of the metal with a radio-graphic film on the outer surface of the jig, then passing a cooling fluid into the jig at spaced openings increasing in area across the width of the jig from the entrance, whereby a more uniform cooling temperature is maintained on the film.

3. The process of making metallic welds so as to use radiographic inspection of the metal while the weld is being made with a minimum of lost time as well as at the finish, said process consisting of preheating the metal around the weld area, then starting the weld and shortly thereafter holding up the welding operation and immediately applying over the weld metal a hollow jig having a radio-graphic film on its outer surface, then passing a cooling fluid through the jig, at the same time locating a radiating element such as radium in a position with respect to the weld and jig so it will pass its rays through the weld and jig onto the film then after a brief interval of time removing the jig and radiating element and continuing the weld to its finish then at once taking pictures of the complete weld while hot, then post heating the weld in the usual manner, then utilizing the usual cooling period and finally taking picture of the cold weld material.

4. The process of making metallic welds as set forth in claim 3 further defined in that the time required to take a picture is so short that no extra pre-heating of the weld metal is needed before the welding begins again after the picture is taken more pictures can be taken while the weld is in progress and much time saved in chipping if a fault is thus earlier discovered.

5. The process of making metallic welds as set forth in claim 3 further defined in that stray radiation from the radiating element can be controlled by the density and speed at which the cooling fluid is sent through the jig.

6. The process for saving time and material in making metallic welds which consists in inspecting the weld at any desired time by placing a jig carrying a radio-graphic film on its outer surface, applying the jig to the weld immediately on stopping the welding operation for only a few minutes, then passing a cooling fluid through the jig, also placing a radiating medium placed in position with respect to the weld so its rays will pass therethrough onto the film whereby any defect in the weld will show up on the film and the defect removed with the least loss of time and material.

7. Means for inspecting and detecting faults in the welds of metal pipes while being welded and under a relatively high heat due to the welding operation, said means including an arcuately formed jig to fit over the periphery of a pipe at the joint to be welded, the jig having two metal plates of suitable width arranged in radial spaced relation and each plate having outwardly turned flanges with a circular member fastened to and between said flanges to hold said plates in said spaced relation to form a cooling chamber between said plates and a chamber inlet nozzle at one end of the jig and a chamber outlet nozzle at the other end thereof, the outer of said two plates having a surface on which a radio-graphic film may be positioned to receive penetrating rays through the weld from a suitable source placed in co-operative relation to the weld and film.

8. Means for inspecting and detecting faults in the welds of metal pipes while being welded and under a relatively high heat due to the welding operation, as set forth in claim 7 further defined in that said jig is composed of two sections each having an arcuate length sufficient to cover approximately one-half the circumference of the pipe on which it is used, and further defined in that the two sections are hinged together and also joined by a union of flexible material forming a connection between the cooling chambers at said hinge position, while the opposite ends of the sections are provided with anchoring means for fastening and unfastening them together and one of these ends having an inlet nozzle and the other an outlet nozzle.

9. Means for inspecting and detecting faults in the welds of metal pipes while being welded and under a relatively high heat due to the welding operation, as set forth in claim 7 further defined in that the flanges of said metal plates have a pipe located therebetween, the pipe being flattened to have flat surfaces to fit between the flanges and welded to the outer edges of the flanges to form a liquid tight joint, the pipe having liquid openings into the space between the plates, to allow good circulation in said space.

10. Means for inspecting and detecting faults in the welds of metal pipes while being welded and under a relatively high heat due to the welding operation, as set forth in claim 7 further defined in that said jig has control valves attached to the inlet and outlet nozzles.

11. Means for inspecting and detecting faults in the welds of metal pipes while being welded and under a relatively high heat due to the welding operation, as set forth in claim 7 further defined in that a pipe is located transversely across at least one end of the jig and having one end connected to the fluid intake nozzle, while the other end is connected to the outlet nozzle, the pipe having a plurality of holes along its length into the cooling chamber, the said holes increasing in diameter from the intake end to the outlet end.

ARCHIE K. McELROY
LOUIS C. McNUTT.

REFERENCES CITED

The following references are of record in the file of this patent:

UNITED STATES PATENTS

| Number | Name | Date |
|---|---|---|
| 2,390,211 | Forssell | Dec. 4, 1945 |
| 2,494,740 | Boucher | Jan. 17, 1950 |

FOREIGN PATENTS

| Number | Country | Date |
|---|---|---|
| 556,383 | Germany | Aug. 9, 1932 |